United States Patent
Brockhoff et al.

(10) Patent No.: US 10,272,962 B2
(45) Date of Patent: Apr. 30, 2019

(54) CHANGING APPARATUS AND CHANGING METHOD FOR CLAMPING FRAMES SUPPORTING VEHICLE BODY PARTS BETWEEN A CLAMPING FRAME TRANSPORT DEVICE AND A FRAME CONVEYOR BY MEANS OF CLAMPING FRAME MAGAZINES

(71) Applicant: KUKA SYSTEMS GMBH, Augsburg (DE)

(72) Inventors: Per-Olaf Brockhoff, Friedberg (DE); Marius Jakob, Augsburg (DE)

(73) Assignee: KUKA SYSTEMS GMBH, Augsburg (DE)

( * ) Notice: Subject to any disclaimer, the term of this patent is extended or adjusted under 35 U.S.C. 154(b) by 0 days.

(21) Appl. No.: 15/121,167

(22) PCT Filed: Feb. 25, 2015

(86) PCT No.: PCT/EP2015/053880
§ 371 (c)(1),
(2) Date: Aug. 24, 2016

(87) PCT Pub. No.: WO2015/128342
PCT Pub. Date: Sep. 3, 2015

(65) Prior Publication Data
US 2017/0008582 A1  Jan. 12, 2017

(30) Foreign Application Priority Data
Feb. 25, 2014  (DE) .................. 20 2014 100 850 U

(51) Int. Cl.
*B62D 65/00* (2006.01)
*B62D 65/02* (2006.01)
*B62D 65/18* (2006.01)

(52) U.S. Cl.
CPC ........... *B62D 65/026* (2013.01); *B62D 65/18* (2013.01)

(58) Field of Classification Search
CPC ....... B62B 65/00; B62B 65/02; B62B 65/022; B62B 65/024; B62B 65/06; B62B 65/18
See application file for complete search history.

(56) References Cited

U.S. PATENT DOCUMENTS 4,638,902 A * 1/1987 Kellner ................ B23K 37/047
198/345.1
4,856,701 A * 8/1989 Pockl ..................... B62D 65/02
219/79

(Continued)

FOREIGN PATENT DOCUMENTS

CN   201385191 Y   1/2010
CN   102837138 A   12/2012

(Continued)

*Primary Examiner* — Tyrone V Hall, Jr.
(74) *Attorney, Agent, or Firm* — McGlew and Tuttle, P.C.

(57) ABSTRACT

An apparatus (14) and a method, for interchanging clamping frames (6-9) at an assembly station (2) for vehicle body parts, includes a storage device (15) for the clamping frames (6-9). The storage device (15) is provided with a plurality of controlled, rotatable frame magazines (16-19) and a frame conveyor (25) and an additional parallel frame transporter (31) which allow the clamping frames (6-9) to be conveyed in parallel between the frame magazines (16-19) and a workplace (10) in the assembly station (2). The clamping frames (6-9) are securely accommodated on the frame magazines (16-19).

20 Claims, 14 Drawing Sheets

(56) References Cited

U.S. PATENT DOCUMENTS

| | | | | |
|---|---|---|---|---|
| 4,893,398 A | * | 1/1990 | Zimmer | B23K 37/047 219/80 |
| 4,928,383 A | * | 5/1990 | Kaczmarek | B23P 21/004 29/711 |
| 5,011,068 A | * | 4/1991 | Stoutenburg | B23K 37/047 228/4.1 |
| 5,067,606 A | * | 11/1991 | Schlatter | B23Q 1/0009 198/465.1 |
| 5,152,050 A | * | 10/1992 | Kaczmarek | B23P 21/004 29/711 |
| 5,239,739 A | * | 8/1993 | Akeel | B23K 37/047 29/430 |
| 5,272,805 A | * | 12/1993 | Akeel | B23K 37/047 29/712 |
| 5,400,944 A | * | 3/1995 | Zimmer | B62D 65/02 228/49.1 |
| 5,560,535 A | * | 10/1996 | Miller | B23K 37/0229 228/49.1 |
| 6,065,200 A | * | 5/2000 | Negre | B23K 31/02 219/86.24 |
| 6,457,574 B1 | * | 10/2002 | Semmlinger | B62D 65/00 198/341.05 |
| 2004/0056497 A1 | | 3/2004 | Ghuman et al. | |
| 2006/0230594 A1 | * | 10/2006 | Stengele | B23Q 7/04 29/431 |
| 2008/0104815 A1 | * | 5/2008 | Kussmaul | B25H 3/00 29/407.01 |
| 2008/0189939 A1 | * | 8/2008 | Kraus | B23K 37/047 29/824 |
| 2011/0138601 A1 | * | 6/2011 | Kilibarda | B62D 65/026 29/428 |
| 2012/0030924 A1 | * | 2/2012 | Kilibarda | B62D 65/026 29/525.01 |
| 2012/0146274 A1 | * | 6/2012 | Kim | B62D 65/026 269/61 |
| 2013/0082169 A1 | * | 4/2013 | Kilibarda | B62D 65/026 250/222.1 |
| 2014/0103591 A1 | * | 4/2014 | Petit | B62D 65/18 269/55 |
| 2015/0001279 A1 | | 1/2015 | Yao et al. | |

FOREIGN PATENT DOCUMENTS

| | | |
|---|---|---|
| DE | 20 2007 005034 U1 | 8/2008 |
| DE | 11 2013 000 302 T5 | 8/2014 |
| EP | 1 352 818 A2 | 10/2003 |
| EP | 1 858 750 A1 | 11/2007 |
| EP | 1 858 750 B1 | 4/2009 |
| EP | 2 279 929 A1 | 2/2011 |
| WO | 92/19486 A1 | 11/1992 |
| WO | 2006/094631 A1 | 9/2006 |
| WO | 2008/122381 A2 | 10/2008 |

* cited by examiner

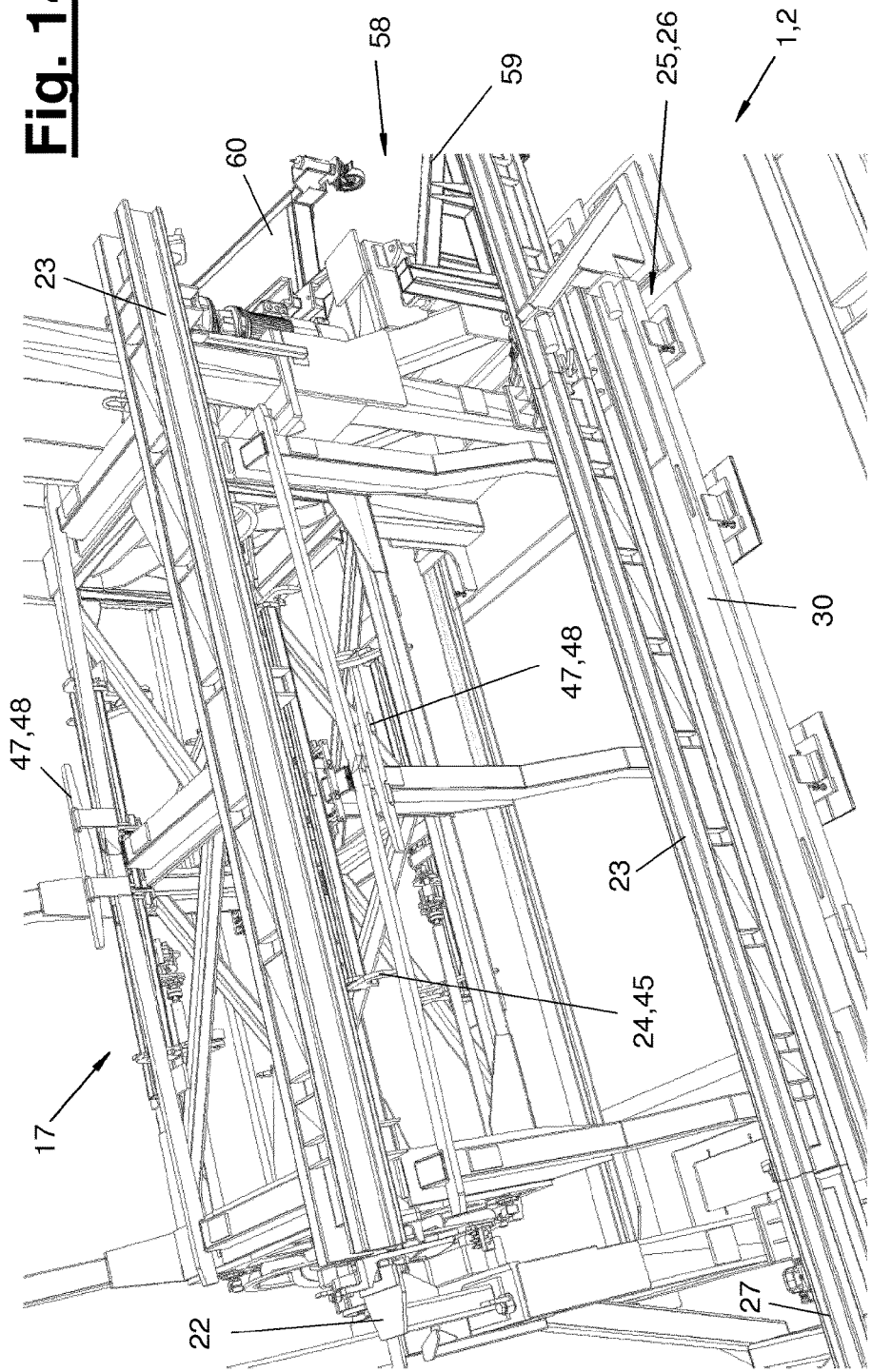

CHANGING APPARATUS AND CHANGING METHOD FOR CLAMPING FRAMES SUPPORTING VEHICLE BODY PARTS BETWEEN A CLAMPING FRAME TRANSPORT DEVICE AND A FRAME CONVEYOR BY MEANS OF CLAMPING FRAME MAGAZINES

CROSS REFERENCE TO RELATED APPLICATIONS

This application is a United States National Phase Application of International Application PCT/EP2015/053880 filed Feb. 25, 2015 and claims the benefit of priority under 35 U.S.C. § 119 of German Application 20 2014 100 850.0 filed Feb. 25, 2014, the entire contents of which are incorporated herein by reference.

FIELD OF THE INVENTION

The present invention pertains to a changing apparatus for clamping frames at a processing station, especially assembly station, for vehicle body parts, wherein the changing apparatus has a storage device for the clamping frames with a plurality of frame magazines movable, especially rotatable, in controlled manner and a frame conveyor, which is intended and configured for transporting the clamping frames between frame magazines and a workplace of the processing statio and to a changing method for clamping frames.

BACKGROUND OF THE INVENTION

Such a changing apparatus is known from EP 1 858 750 B1. It is arranged at an assembly station for vehicle body parts, especially at a so-called geostation or framing station, and has a plurality of frame magazines rotatable in a controlled manner and a frame conveyor, which transports the clamping frames between the magazines and to a workstation of the assembly station. The prior-art changing apparatus permits the use and change of clamping frames having different configurations and adapted to different vehicle body types.

SUMMARY OF THE INVENTION

An object of the present invention is to provide further an improved changing apparatus and improved clamping frame logistics.

The present invention accomplishes this object with a changing apparatus and method for clamping frames at a processing station, especially assembly station, for vehicle body parts. The changing apparatus has a storage device for the clamping frames with a plurality of frame magazines movable, especially rotatable, in a controlled manner. A frame conveyor is configured for transporting the clamping frames between frame magazines and a workplace of the processing station. The clamping frames are securely accommodated at the frame magazines and the changing apparatus has another frame transporter, which is likewise connected to the frame magazines serviced by the frame conveyor.

The changing technique according to the invention, especially the changing apparatus and the changing method, offer increased flexibility for the use and the change of different, type-specific clamping frames. In addition, the clamping frame can be replaced more rapidly when changing the vehicle body type and the particular vehicle body parts. Further, the number of different clamping frames and clamping frame types available can be increased even further compared to the state of the art. The availability of the particular clamping frame needed in a short time is guaranteed despite the increased number of clamping frames.

The clamping frames are stored temporarily in a plurality of frame magazines, in which they can be securely accommodated. This is especially advantageous in case of a horizontal accommodation of the frames in a drum magazine and may also ensure an intrinsic stability of the clamping frame and of the components thereof as well as identifiability. The secured accommodation can be achieved by a controlled locking device and/or a media coupling. The locking device fixes the particular clamping frame in the accommodation position and releases it again for the frame change. In addition, the media coupling can be automatically opened or closed by means of the locking device. Operating materials, especially fluids, and data can be transmitted by means of the media coupling between the frame magazine and the respective clamping frame.

The frame conveyor and the associated frame transporter offer a plurality of parallel connection possibilities for the corresponding frame magazines. The frame conveyor connects the frame magazines to the workstation. It can also transport two clamping frames simultaneously during the frame change. It can remove the previous clamping frame and feed the new clamping frame. The frame transporter preferably associated in parallel permits, independently from the frame conveyor, a change of clamping frames between different frame magazines. A backflow, especially a circulation, of the clamping frames between the frame magazines can be achieved hereby.

The conveying operation of the frame transporter may take place independently and simultaneously with the conveying operation of the frame conveyor. Overfilling of the magazine can be avoided hereby, on the one hand. On the other hand, empty magazine places, which are useful or necessary for a clamping frame change performed by the frame conveyor, can be formed in a simple manner. Furthermore, needless idle travels of the frame conveyor can be avoided.

The parallel operation of the frame conveyor and frame transporter significantly shortens the change times for a clamping frame. An even number of magazine places at the frame magazines is useful for this.

Another advantage is the generation of additional, at least temporary storage places for clamping frames. For example, at least one such temporary storage place can be formed on the conveyor track of the frame transporter between the frame magazines. Further, additional storage places can also be generated in another manner next to the frame magazines. This is possible especially due to a conveyor track of the frame transporter extended beyond a frame magazine.

The clamping frames are advantageously guided in a stable manner with a single rail during the transportation on a guide path. The conveying device, especially the towing spar, is guided in parallel thereto and separately. This saves space and design effort and offers a simplified, highly flexible, extremely rapid and cost-effective conveying technique.

At the workplace, the clamping frames can be fed by a feeding device and positioned and fixed accurately stationarily with a positioning device at a frame in all three directions x, y, z in space or space axes. Positioning by a plurality of roller blocks and a strut is especially effective and reliable in operation and offers reliable and accurate positioning with high accuracy of reproduction even under different environmental and process conditions, especially during welding.

Clamping frames can be removed from and fed to the processing station as needed by means of a discharge device of the changing apparatus. This is advantageous, e.g., for maintenance purposes or for rapid retrofitting.

The present invention is shown schematically in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 14 is an enlarged perspective detail view of a frame magazine according to FIGS. 11 through 13.

DESCRIPTION OF THE PREFERRED EMBODIMENTS

Figure 1:
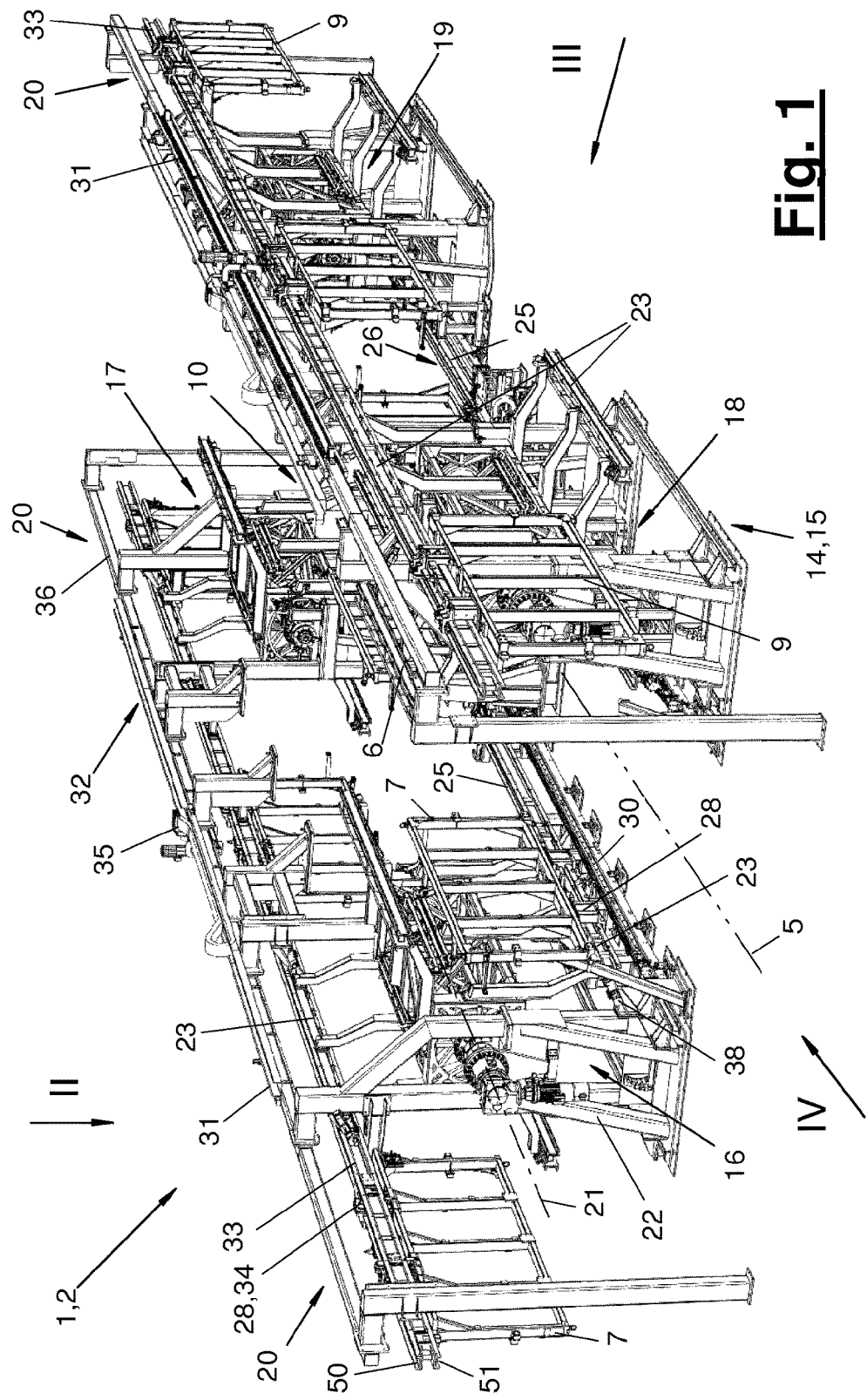
FIG. 1 is a perspective view of a processing station with a changing apparatus.

Referring to the drawings, the present invention pertains to a changing apparatus (14) for clamping frames (6-9) and to a changing method. The present invention pertains, furthermore, to a processing station (2) equipped with such a changing apparatus and, furthermore, also to a processing plant (1) equipped with one or more such, possibly interlinked processing stations (2).

The processing station (2) is preferably configured as an assembly station, especially as a so-called geostation or framing station for assembling workpieces (4). The workpieces (4) are preferably configured as vehicle body parts, especially sheet metal parts, of a vehicle body shell. It may be, e.g., a floor assembly and left and right side walls, which are brought to one another in the assembly station (2) in their predefined relative position, braced in this position and then assembled, e.g., by welding. The connection of the body parts can at first be tacked in the geostation (2) and welded in a further, downstream assembly station. This may have a configuration corresponding to that of the geostation.

The vehicle body parts (4) are fed to the assembly station (2) on a transfer line (5), and they are transported in a self-supporting manner or by means of a pallet or of another carrier on a conveyor, e.g., a lifting shuttle, a skid conveyor or the like along the transfer line (5). The transfer line (5) may interlink a number of stations (2).

The vehicle body parts (4), especially the floor assembly and the side walls, may be fed, e.g., in a prepositioned and loosely preassembled, especially clamped association. In another variant, a floor assembly may be fed on the transfer line (5), and the side walls are fed separately therefrom at the assembly station (2).

Figure 2:
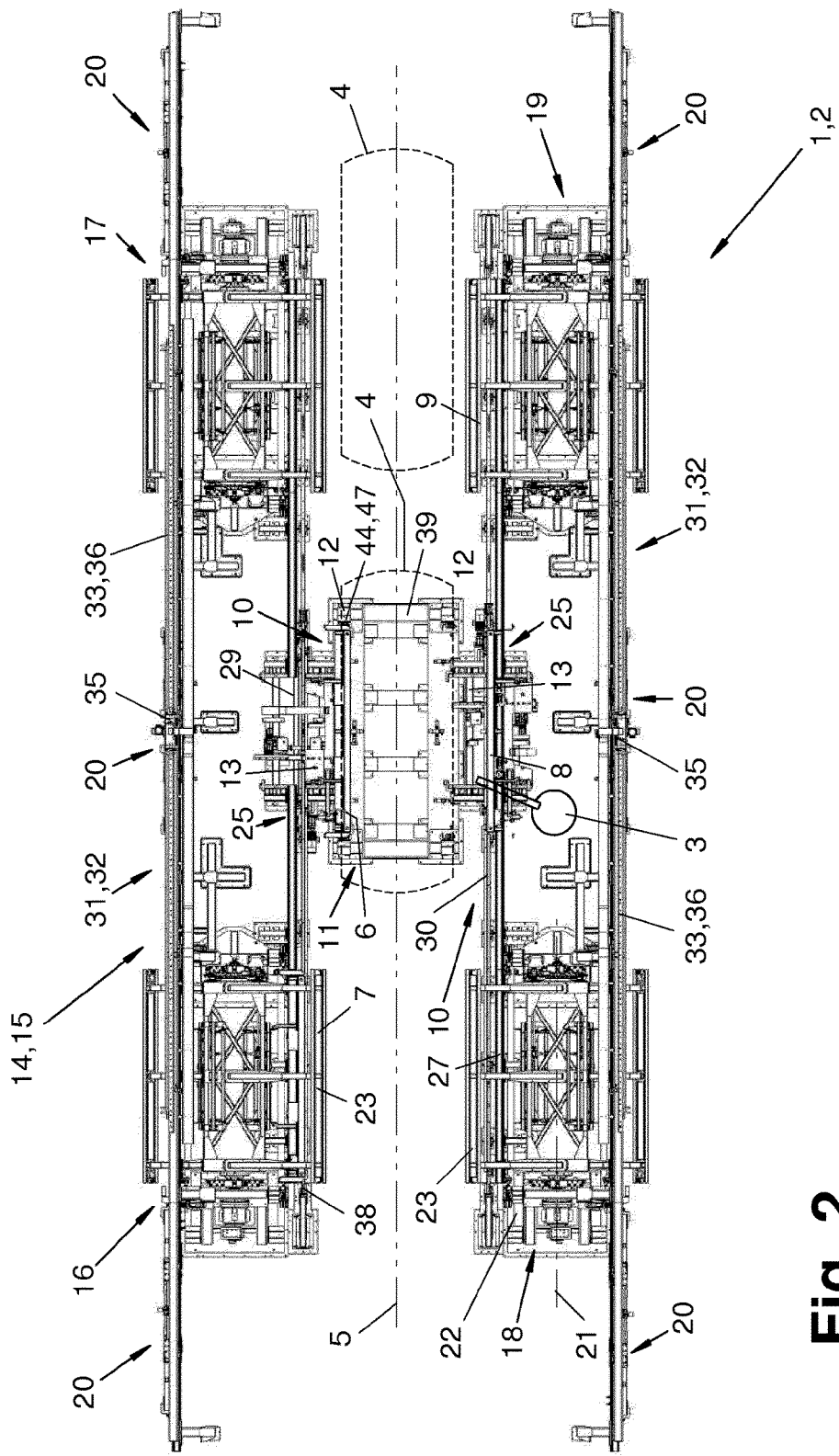
FIG. 2 is a top view of the processing station according to arrow II in FIG. 1.
Figure 3:
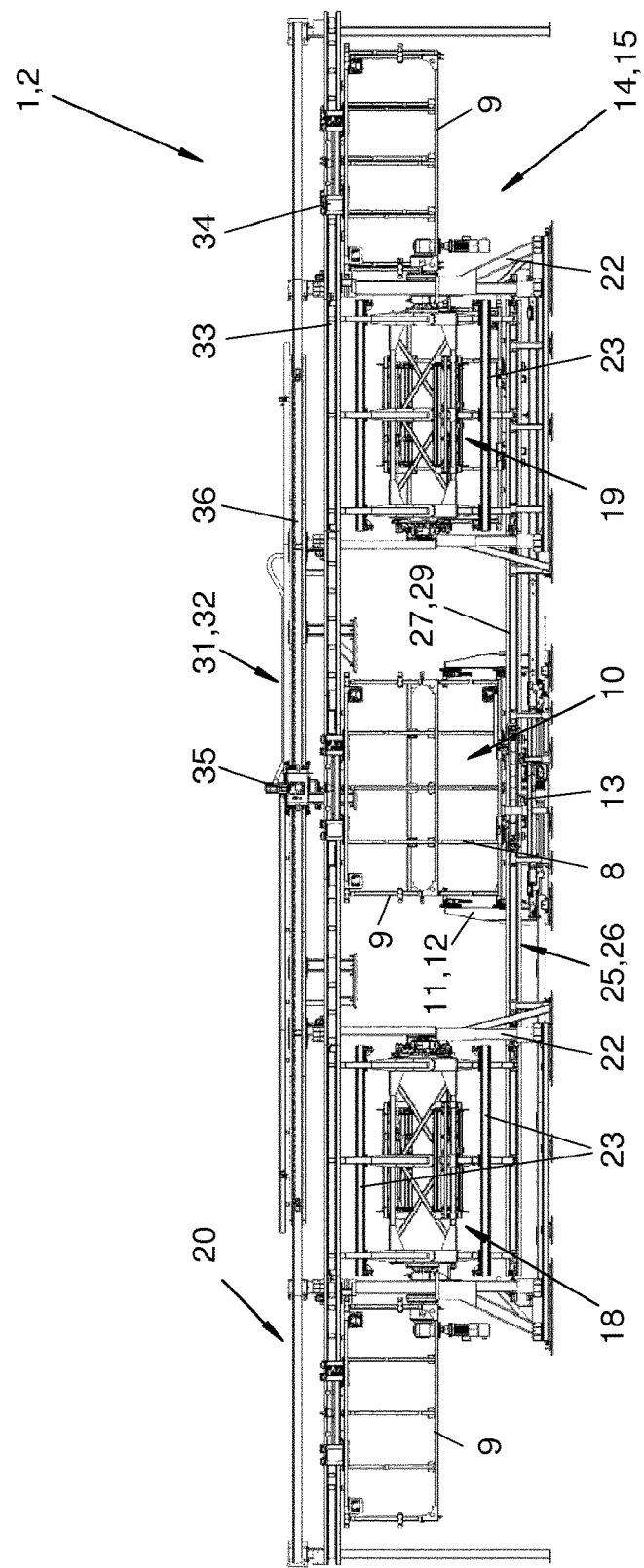
FIG. 3 is a side view of the processing station according to arrow III in FIG. 1.

The assembly station (2) has a workplace (10), at which one or more processing devices (3) are arranged for carrying out the processing process. They are arranged on both sides of the transfer line (5) and are preferably configured as industrial robots with a suitable assembly tool, e.g., a welding tool. FIG. 2 schematically indicates an industrial robot or welding robot (3). Depending on the type of the processing process, the industrial robots may carry other tools as well.

Figure 9:
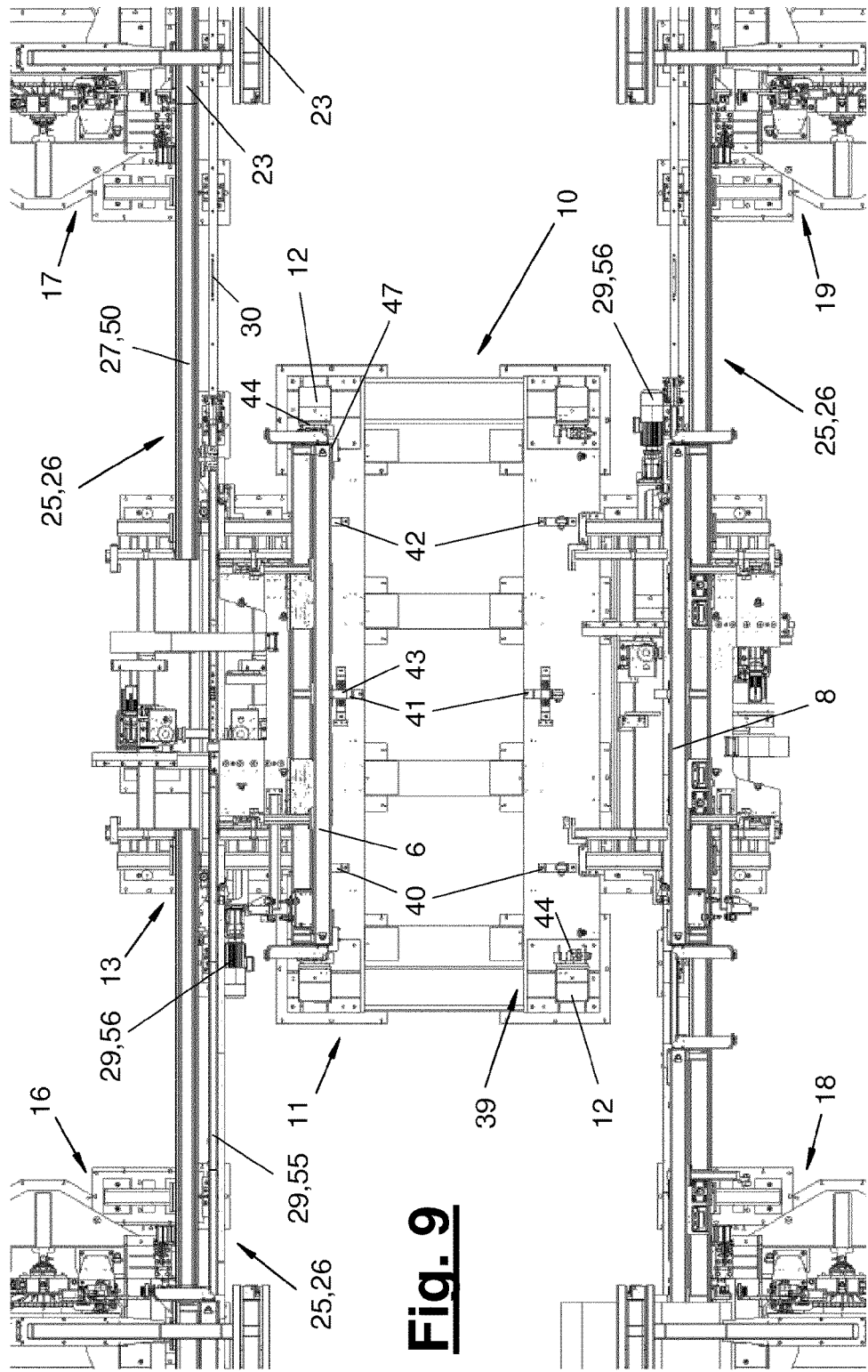
FIG. 9 is an enlarged top view of the workplace according to FIG. 2.
Figure 10:
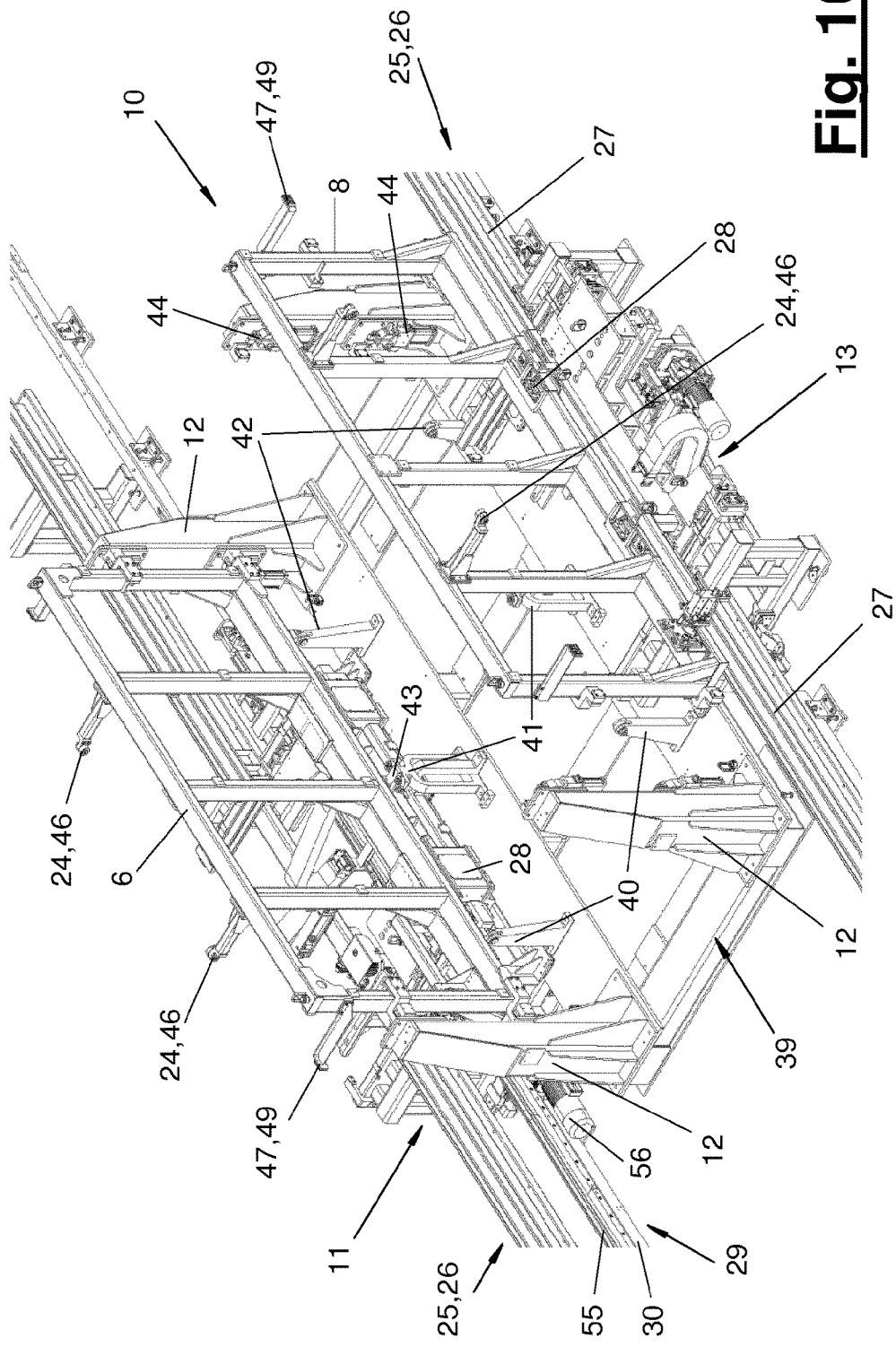
FIG. 10 is a perspective view of the workplace according to FIG. 9.
Figure 11:
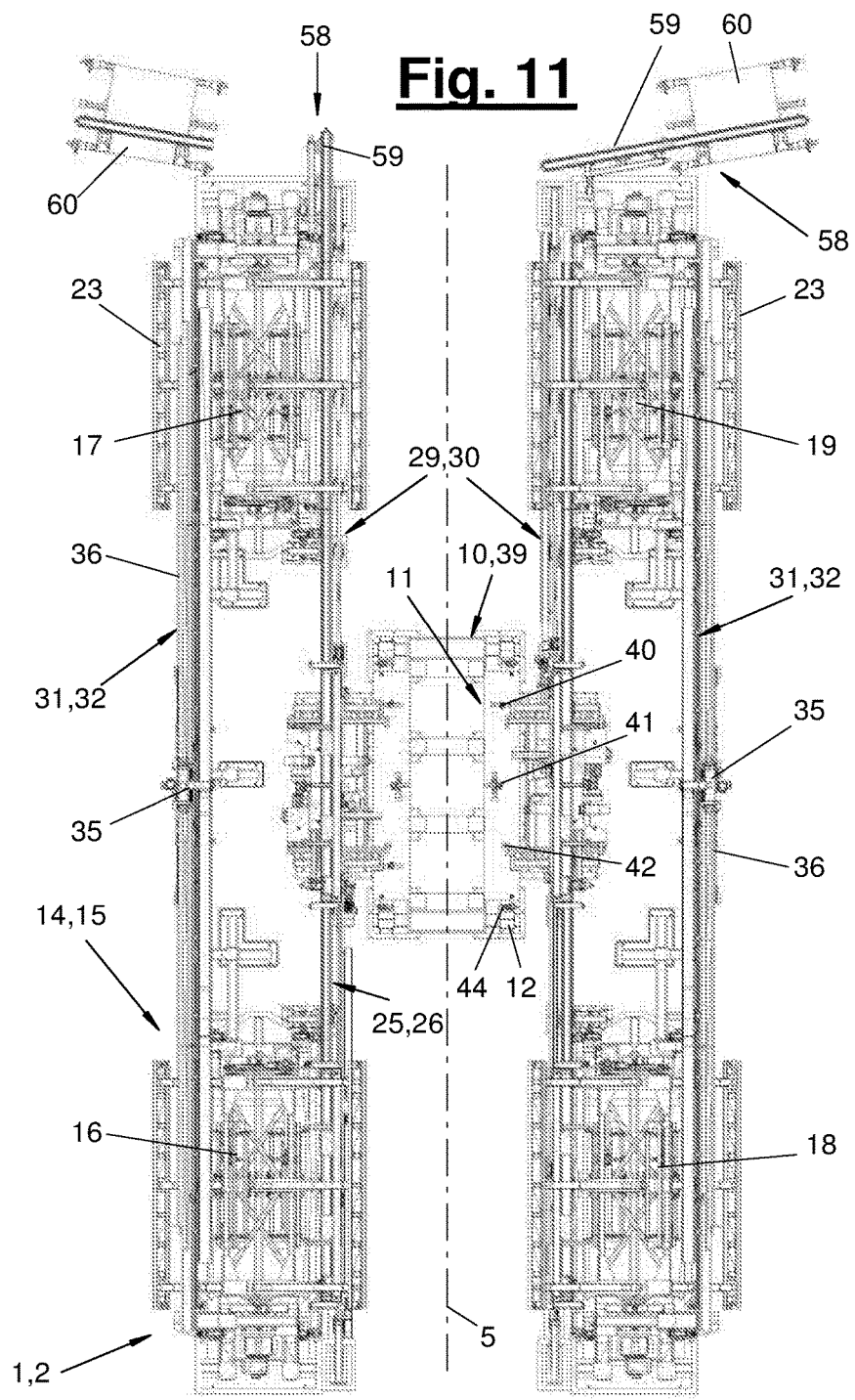
FIG. 11 is a variant of the changing apparatus from FIGS. 1 through 10 in a top view.
Figure 12:
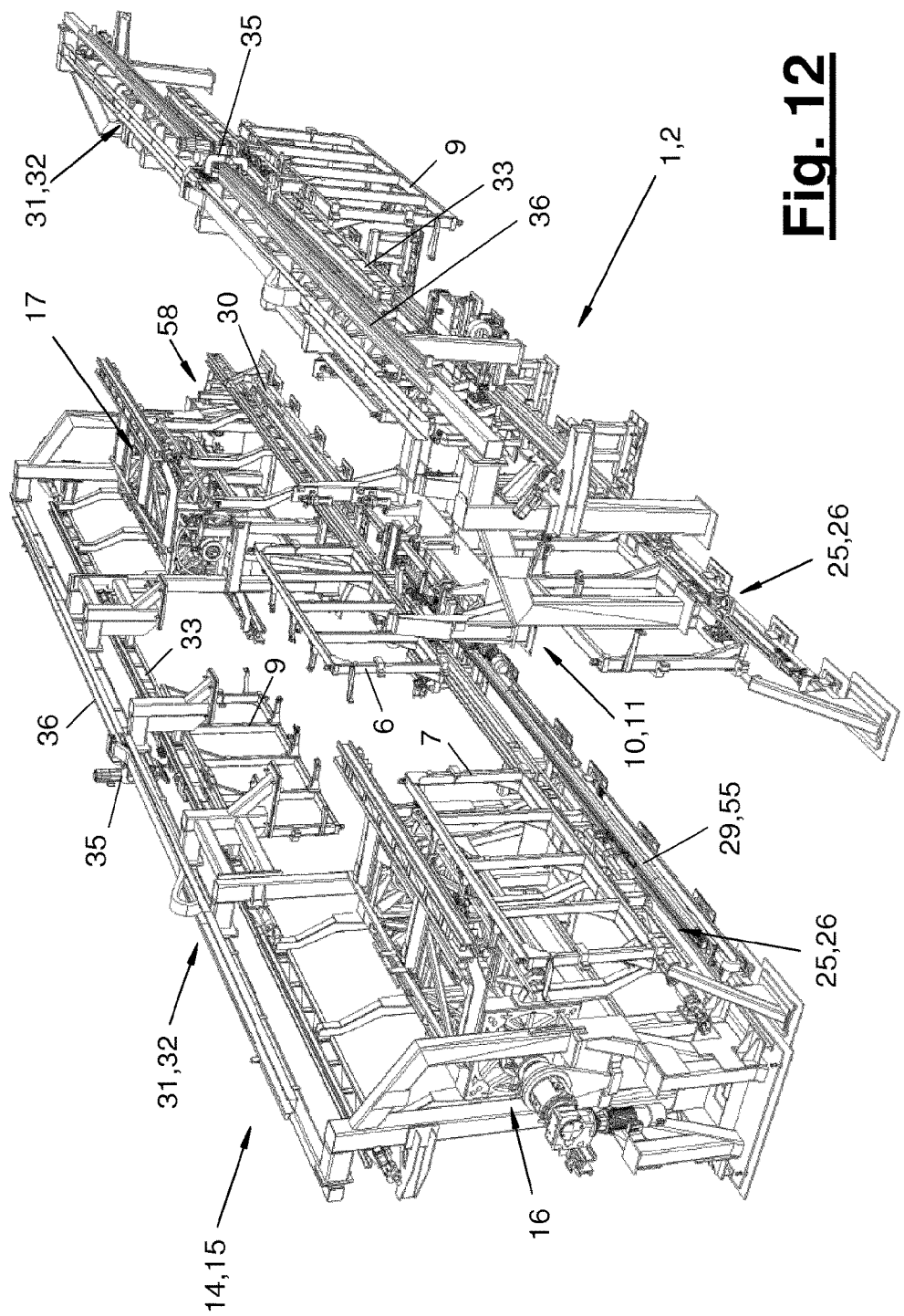
FIG. 12 is a perspective view abstracted on one side of the variant of FIG. 11.

The vehicle body parts (4) and/or their carrier are brought into an accurate, predefined position at the workplace (10) by means of a prepositioning device (39) schematically indicated in FIGS. 2, 9 and 10.

The positioning, mutual alignment and clamping of the vehicle body parts (4) to be assembled is carried out by means of clamping frames, which are fed on both sides to the transfer line (5) and vehicle body parts (4) located there by means of a feeding device (13) at the workplace (10). Vehicle body parts (4) can also be fed by the clamping frames (6-9) to the workplace (10).

The clamping frames (6-9) comprise a plate-like or frame-like carrier and clamping device arranged thereon as well as positioning and support devices for the vehicle body parts (4). In addition, additional components, e.g., auxiliary tools, etc., may be attached. A clamping frame (6-9) may be supplied with operating materials or media in a suitable manner. These may be electric signal and power currents, fluids, especially compressed air, coolant, hydraulic fluid or the like. The clamping, positioning and support devices may be actuated and moved, e.g., electromechanically or fluidically, especially pneumatically.

The clamping frames (6-9) are positioned accurately at the workplace (10) on both sides of the transfer line (5) and are taken up stationarily. The assembly station (2) according to FIGS. 2, 9 and 10 has a frame (12) for this with, e.g., a plurality of, especially four, upright corner structures, at which the clamping frames (6-9) are taken up and fixed by means of a positioning device (11) in a predefined position and in clamping position relative to the vehicle body parts (4). A media supply may also take place by means of suitable media couplings (47).

The positioning device (11) is arranged on one side or on both sides of the transfer line (5). It interacts with the respective feeding device (13) during the feed motion or crossfeed of the latter. In the view shown in FIGS. 2, 9 and 10, one clamping frame (6) is in the clamped position at the workplace (10). The other clamping frame (8) assumes a waiting position before the crossfeed.

As is illustrated in FIGS. 2, 9 and 10, the positioning device (11) has a plurality of positioning elements (40, 41, 42), which take up the clamping frame (6-9), support it and position it accurately in the three directions x, y and z in space. Controllable fixing devices (44), e.g., tensioners, which fix the clamping frame (6-9) in the accurate position assumed and also support it against forces occurring during processing and forces of reaction, are arranged at the frame (12), especially at the corner structures.

The positioning elements (40, 41, 42) are configured, e.g., each as three floor-mounted roller blocks lined up along the transfer line (5), on which the clamping frame (6-9) slides up during said crossfeed and is positioned by means of the rollers. The two outer roller blocks (40, 42) position it with upright rollers in the vertical z direction. The horizontal roller pair of the middle roller block (41) positions with a stop function at right angles to the transfer line (5) in the y direction. A positioning element (43) arranged at the clamping frame (6-9), e.g., a strut, extends between the rollers of the pair during the crossfeed, as a result of which the clamping frame (6-9) is positioned in the x direction along the transfer line (5). As an alternative, the positioning elements (40, 41, 42) may be configured as sliding blocks or in another manner.

On the other hand, the configuration of the clamping frames (6-9) and of the aforementioned other components of the station may be the same for carrying out the processing process, especially assembly process, as in EP 1 858 750 B1.

A changing apparatus (14) for the clamping frames (6-9) is arranged in the processing station (2), especially assembly station. Different vehicle body parts (4) may be fed and processed in a free mix in the processing plant (1) and the processing station (2). The differences may pertain to different body types of a vehicle product line, e.g., bodies for a limousine, a cabriolet or the like. The side walls (4) and hence the clamping frames (6-9) adapted to them change correspondingly. The clamping frames (6-9) are also replaced when changing over from one type to another.

The changing apparatus (14) has a storage device (15) for different clamping frames (6-9) and a frame conveyor (25) as well as a frame transporter (31). The storage device (15) has a plurality of frame magazines (16-19), which are movable in a controlled manner, wherein a plurality of clamping frames (6-9) are detachably arranged at each frame magazine (16-19).

In the exemplary embodiments shown, the frame magazines (16-19) for the clamping frames (6-9) are arranged on both sides of the transfer line (5). This may be a centrally symmetrical arrangement in relation to the central transfer line (5).

The changing apparatus (14) has a control, not shown, to which the frame magazines (16-19) and the conveying devices (25, 31) as well as the feeding devices (13) with the positioning devices (11) and possibly additional controllable components mentioned below are connected. This control may be connected to a higher-level station control or integrated in same.

The frame magazines (16, 17 and 18, 19) are each arranged, when viewed in the transfer direction (5) at mutually spaced locations and on both sides of the workplace (10). The storage device (15) shown has four frame magazines (16-19) in a distributed arrangement. In addition, it may have one or more additional storage places (20) for one or more clamping frames (6, 9). This will be discussed in more detail later.

The frame magazines (16-19) are configured in the exemplary embodiments shown as drum magazines, which are arranged rotatably about a horizontal axis of rotation (21) at a magazine frame (22). The frame magazines (16-19) have a plurality of magazine places for receiving a clamping frame (6-9) each. The axis of rotation (21), the magazine places and the frame storage places are preferably aligned along the transfer line (5). The number of magazine places is preferably an even number. Four magazine places each are present in the exemplary embodiments shown.

The frame conveyor (25) is provided for the transport of the clamping frames (6-9) between the respective associated frame magazines (16-19) and the workplace (10). The frame conveyor (25) is arranged between the frame magazines (16, 17 and 18, 19) arranged and lined up along the transfer line (5) and the transfer line (5). It is also arranged next to the station frame (12), e.g., at a laterally spaced location. The conveying direction of the frame conveyor (25) is likewise oriented along the transfer line (5), especially in parallel thereto. Said arrangement is present on one side and on both sides of the transfer line (5) and is oriented in parallel thereto.

The frame conveyor (25) has a conveyor track (26) and a driven as well as controllable conveying device (29). The conveyor track (26) may be a multipart conveyor track. It may have a guiding device (27, 28) for independently supporting and guiding the clamping frames (6-9) as well as optionally a separate guide path (30) for the conveying device (29). The guiding device (27, 28) may be configured, e.g., as a stationary rail arrangement (27) and as a sliding or rolling running gear each arranged at a clamping frame (6-9). The association and the kinematics may also be reversed. The guide path (30) may likewise be configured as a rail guide.

The frame conveyor (25) can collect a new clamping frame (6, 8) from a frame magazine (16-19) or from a storage place (20), feed it to the area of the workplace (10) and take over in turn a currently used clamping frame (6, 8) and feed it to the same or preferably another frame magazine (16-19) or storage place (20). The frame conveyor (25) may optionally move for this, at least temporarily, a plurality of clamping frames (6-9) at the same time.

Figure 5:
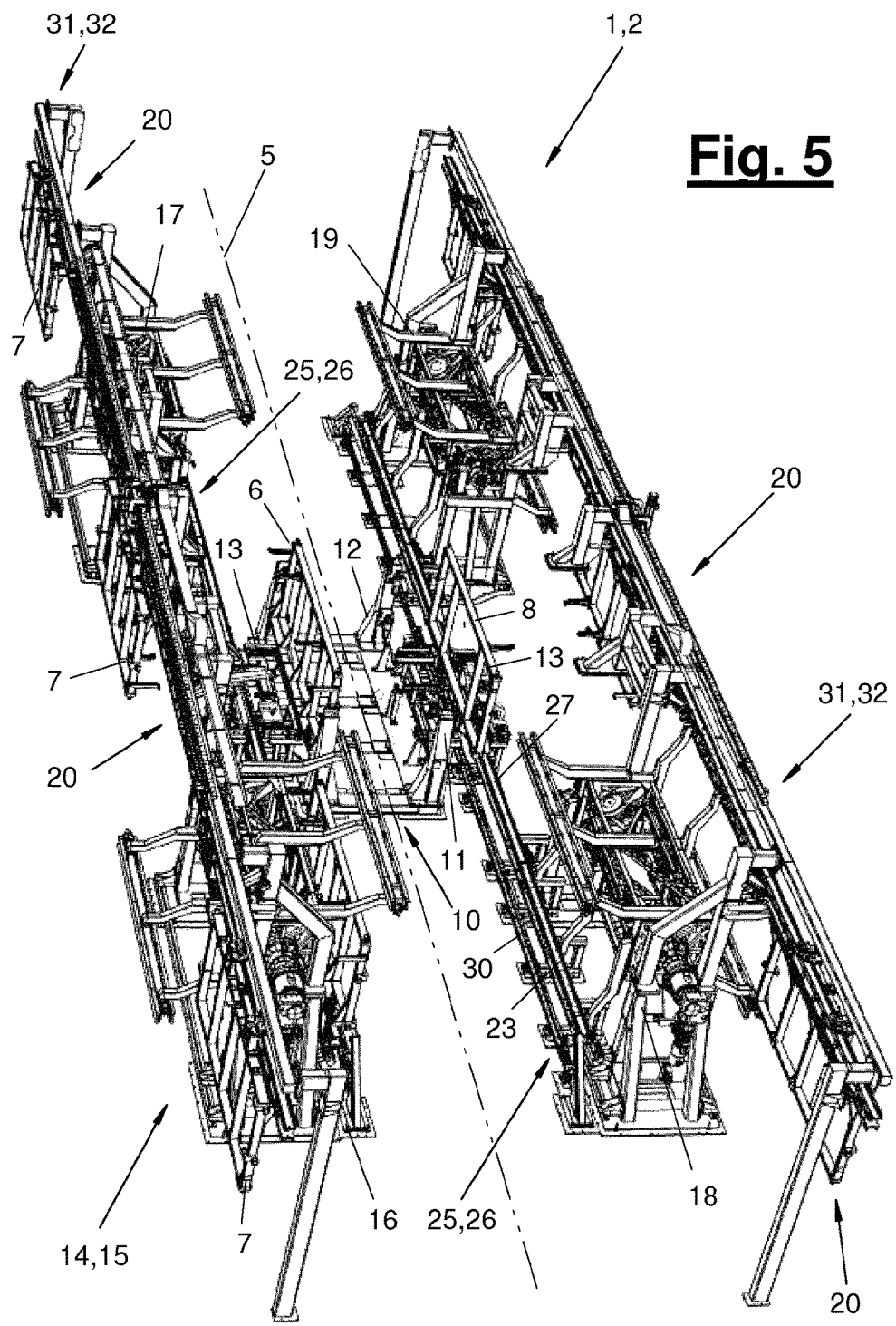
FIG. 5 is another perspective view of the processing station from FIGS. 1 through 4.
Figure 6:
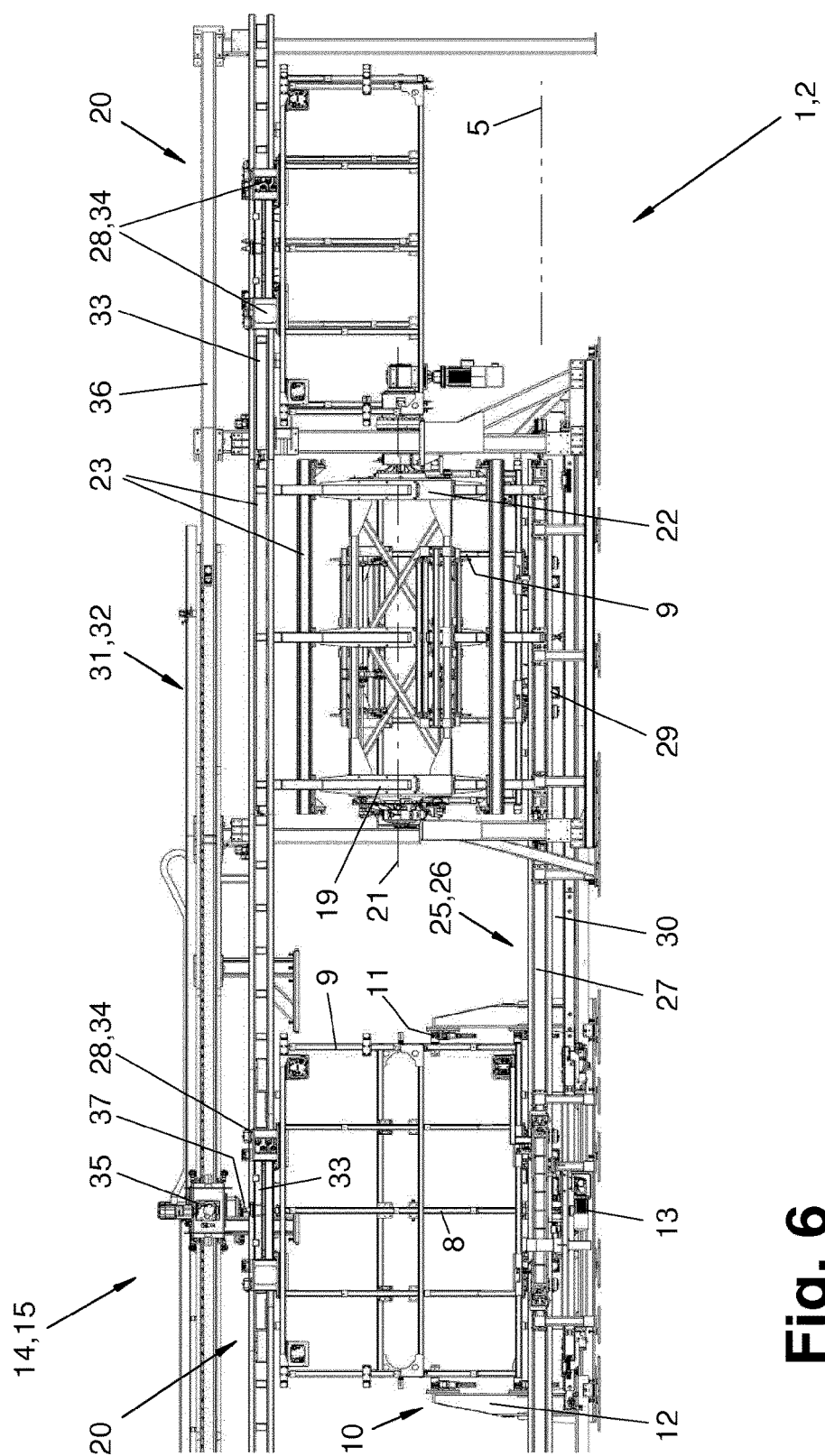
FIG. 6 is a cut-away and enlarged detail view of FIG. 3.

A frame conveyor (25) may have one or more conveying devices (29). The frame conveyor (25) shown in FIGS. 1, 5 and 7 has an individual conveying device (29) with a spar (55), especially towing spar, which is guided at or on the conveyor track (30) and is driven reversingly by a controllable, preferably stationary drive (56). The drive (56) has, e.g., an electric motor, which moves the spar (55) forward and backward via a toothed rack drive or the like. The conveyor track (30) is configured, e.g., as a stationary rail, on or at which the spar (55), which has, e.g., a U-shaped cross section, is guided with low friction by means of rolling or sliding devices.

The spar (55) projects over somewhat more than half the length of the station (21) and carries a coupling device (37) for two clamping frames (6-9). This coupling device comprises, e.g., two axially spaced, controllable carriers (57), which enter a towing engagement with a clamping frame (6-9) in a waiting position at the workplace (10) and with another clamping frame (6-9) kept ready for change in a frame magazine (16-19).

As a result, the clamping frame (6-9) that is no longer needed can be brought from the waiting position into a frame magazine (16-19) and a new clamping frame (6-9) can be brought from another frame magazine (16-19) into the waiting position at the workplace (10) with a single travel motion of the towing spar (55) at the time of the clamping frame change. A clamping frame change is possible in both directions along the transfer line (5), and the direction of change can be freely selected.

Figure 7:
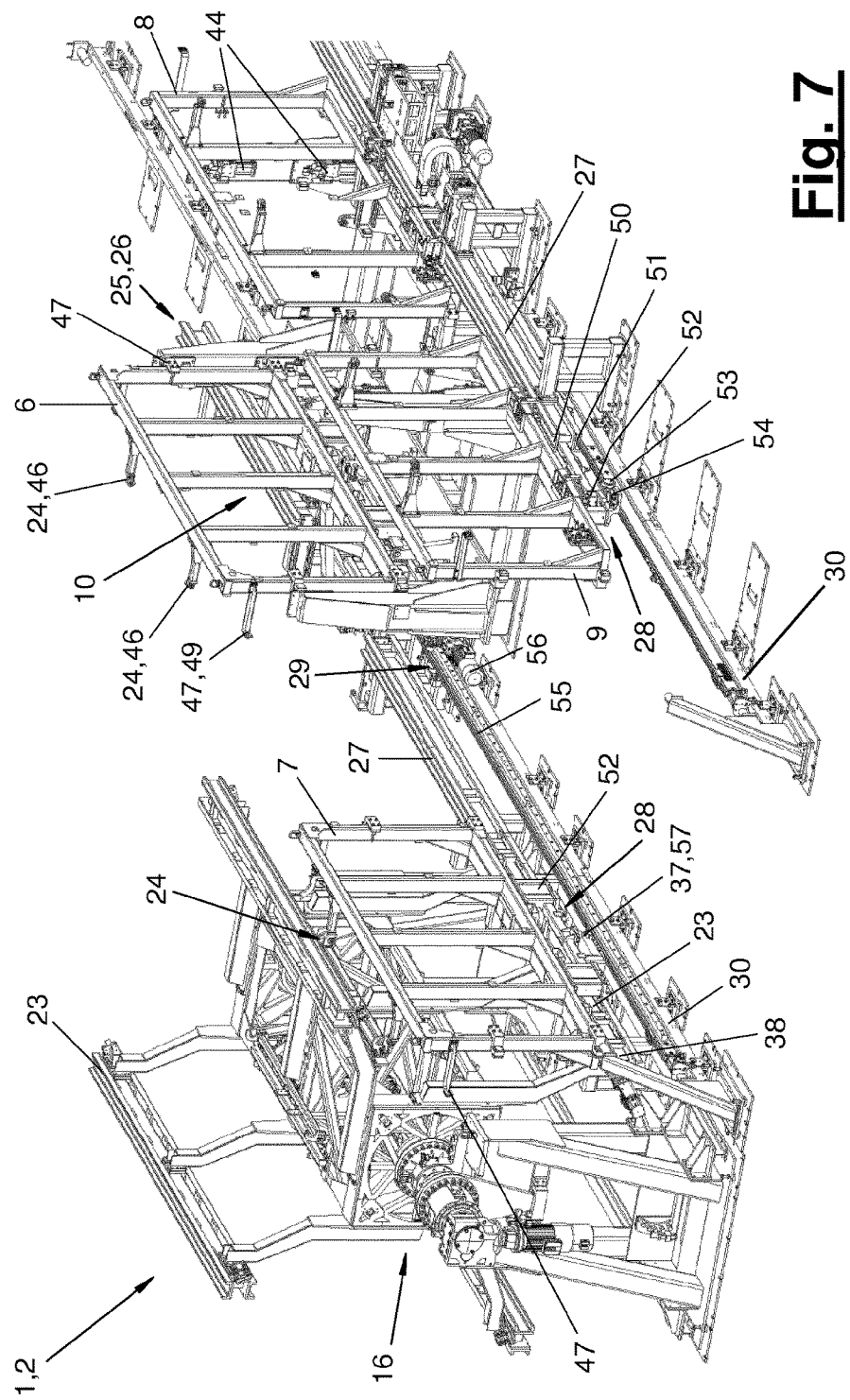
FIG. 7 is a cut-away, abstracted and enlarged detail view of FIG. 1.

FIG. 7 shows this engaged position with the clamping frame (8, 9) on the right side of the station before the delivery stroke of the spar (55), during which the clamping frame (8) to be changed is then brought into the frame magazine (19) and a new clamping frame (9) is fed from the frame magazine (17). The frame magazines (17, 19) are not shown for reasons of clarity.

In case of an alternative multiple arrangement of conveying devices (29), e.g., two conveying devices (29) are present, which are driven and controlled independently and can move separately from one another on a preferably common conveyor track (30). The conveying device or conveying devices (29) may be designed, e.g., as tow cars.

The conveyor track (26) shown in FIGS. 1 through 10 has an individual rail (27) for the guided upright transport of the clamping frames (6-9). The rail (27) has upper and lower, preferably U-shaped guide tracks (50, 51), in or at which vertical and horizontal support rollers (53, 54) of the running gear (28) run. The running gear (28) has two or more support arms (52), which project from the clamping frame (6-9) and which extend around the rail (27) laterally in a fork-like manner and carry upper and lower pairs of support rollers (53, 54). This track and roller arrangement makes possible a space-saving and stable guiding of the clamping frames. As an alternative, the two or more guide tracks (50, 51) may be configured and/or arranged differently, e.g., on the side or diagonally opposite.

A controllable and driven feeding device (13) is provided for the transverse transport of the clamping frames (6-9) from the frame conveyor (25) to the station frame (12) as well as to the workplace (10) located there and back. It removes a clamping frame (6, 8) from the frame conveyor (25) and transports it to the station frame (12) as well as to the positioning device (11) located there. The feeding device (13) brings the previously unused clamping frame (6, 8) back to the frame conveyor (25). The latter can then transport the changed clamping frame (6, 8) further to the other frame magazine.

As is illustrated in FIGS. 2, 4, 9 and 10, the feeding device (13) has a slide displaceable at right angles to the transfer line (5) with a controllable drive and with a track or rail section for receiving an upright clamping frame (6-9) with a running gear (28). The preferably individual track or rail section may be fitted into a gap of the rail (27). It has sufficient guide clearance for the support rollers (53, 54) to make possible the positioning motion at the positioning device (11) and the positioning elements (40-43) thereof.

The changing apparatus (14) has said further frame transporter (31), which is likewise connected to the frame magazines (16-19) serviced by the frame conveyor (25). In the embodiment of the changing apparatus (14) shown, a frame transporter (31) each is arranged on both sides of the transfer line (5). One frame transporter (31) is connected to the frame magazines (16, 17) on one side of the transfer line (5). On the other side, the frame transporter (31) is connected to the frame magazines (18, 19).

The frame conveyor (25) and the respective associated frame transporter (31) are arranged on different sides of the jointly serviced frame magazines (16-19). The frame conveyor (25) is located, e.g., on the front side pointing toward the transfer line (5) and the frame transporter (31) is located on the opposite rear side of the respective frame magazines (16-19). The frame transporter (31) may be arranged, as an alternative, on the top side or on the underside of the respective frame magazines (16-19). In another variant, a plurality of frame transporters (31) may be associated with a row of magazines and with a frame conveyor (25).

The frame transporter (31) likewise has a conveyor track (32) and a driven, controllable conveying device (35). The conveyor track (32) extends along the transfer line (5). It may likewise have a multipart configuration by having an independent guiding device (33, 34) for the clamping frames (6-9) and a guide path (36) for the convening device (35). The guiding device (33, 34) may be configured as a rail arrangement and as a running gear for the clamping frames (6-9). The existing running gear (28) of the frame conveyor (25) or an additional running gear, which may optionally have a different configuration and may be arranged at another location of the clamping frame, may be used as the running gear (34). The guide path (36) may be designed as a rail guide and possibly in the above-described manner with guide tracks (50, 51). The controllable guiding device (35) is configured, e.g., as a tow car. It may be present as a single tow car or as a plurality of tow cars, with, e.g., one or two tow cars moving on the guide path (36).

The guiding device (29, 35) may have each a controllable coupling device (37) for coupling and uncoupling one or more clamping frames (6-9). The coupling device (37) preferably operates with positive-locking connection. The coupling device (37) is formed by the two carriers (57) at the towing spar (55). Due to the separate guiding of the clamping frames (6-9) and conveying devices (29, 35), the latter can move independently from the clamping frames (6-9) along their respective conveyor track (26, 32) or guide path (30, 36).

The frame conveyor or frame conveyors (25) and the frame transporter or frame transporters (31) may have a similar configuration. As an alternative, they may be different. Possible design variants will be described in this connection at the end of the description.

The conveyor tracks (26, 32) of the frame conveyor (25) and the respective associated frame transporter (31) are connected to a frame magazine (16-19) at different levels. The conveyor track (26) is connected, e.g., on the underside of the frame magazines (16-19) and the conveyor track (32) on the top side of the frame magazines (16-19). This is especially advantageous in case of the magazine configuration shown, in which the magazine is configured as a horizontally arranged drum magazine.

The frame conveyor (25) is configured in the preferred exemplary embodiments shown as a bottom-side conveyor, the clamping frames (6-9) being transported on the conveyor track (26) in the upright position and being guided there or on the top side in a suitable manner. The frame transporter (31) is configured as an elevated hanging conveyor, wherein the clamping frames (6-9) are transported hanging on the conveyor track (36). The arrangement shown may also be reversed.

The transfer of the clamping frames (6-9) from the conveying devices (25, 31) to the frame magazines (16-19) and back may be effected in any suitable manner. For example, a frame holder (23) each, e.g., a support rail receiving in a positive-locking manner, which is aligned, depending on the rotation position of the frame magazine (16-19), with the conveyor track (26), especially the rail (27), of the frame conveyor (25) and the conveyor track (32), especially the rail (23), of the frame transporter (31) and permits the clamping frame (6, 9), e.g., of the running gear (28, 34) thereof, to be pushed in, is present for this at the magazine places.

The frame holder (23) and the conveyor track (26) have an identical form, especially the form of a rail with guiding tracks (50, 51). Controllable rail fixing devices (38) may be arranged at the frame magazines (16-19) for positioning and securing the aligned position of the frame holder (23) and conveyor track (26).

The frame magazines (16-19) may have, further, at the magazine places a controllable locking device (24) each, which additionally fixes the received clamping frame (6-9) and releases it again for removal. The clamping frame (6-9) may be secured especially in the horizontal position and held in its correct position. In addition, the transfer and takeover position is defined in relation to the conveyor track (26, 32).

Figure 4:
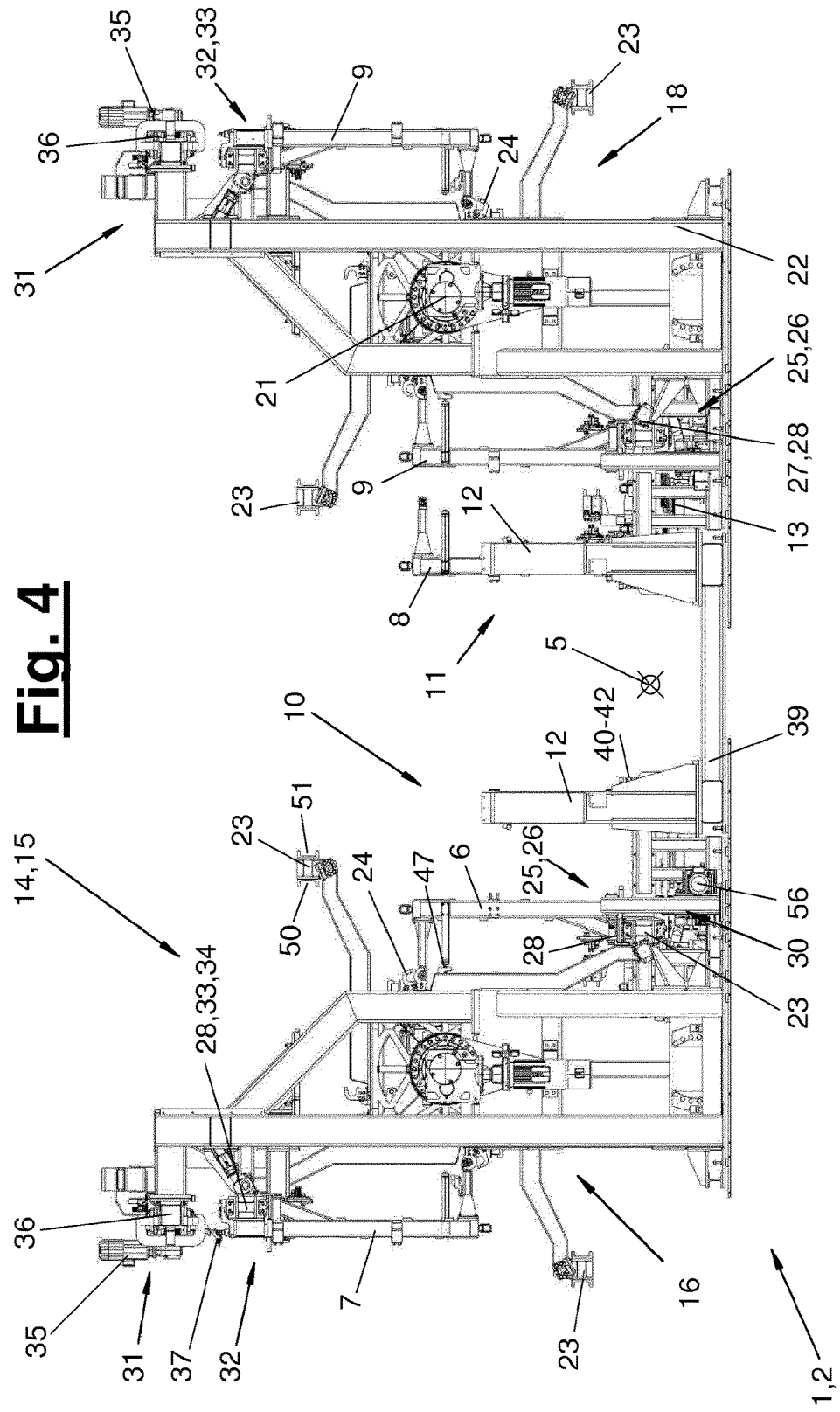
FIG. 4 is a front view of the processing station according to arrow IV in FIG. 1.
Figure 8:
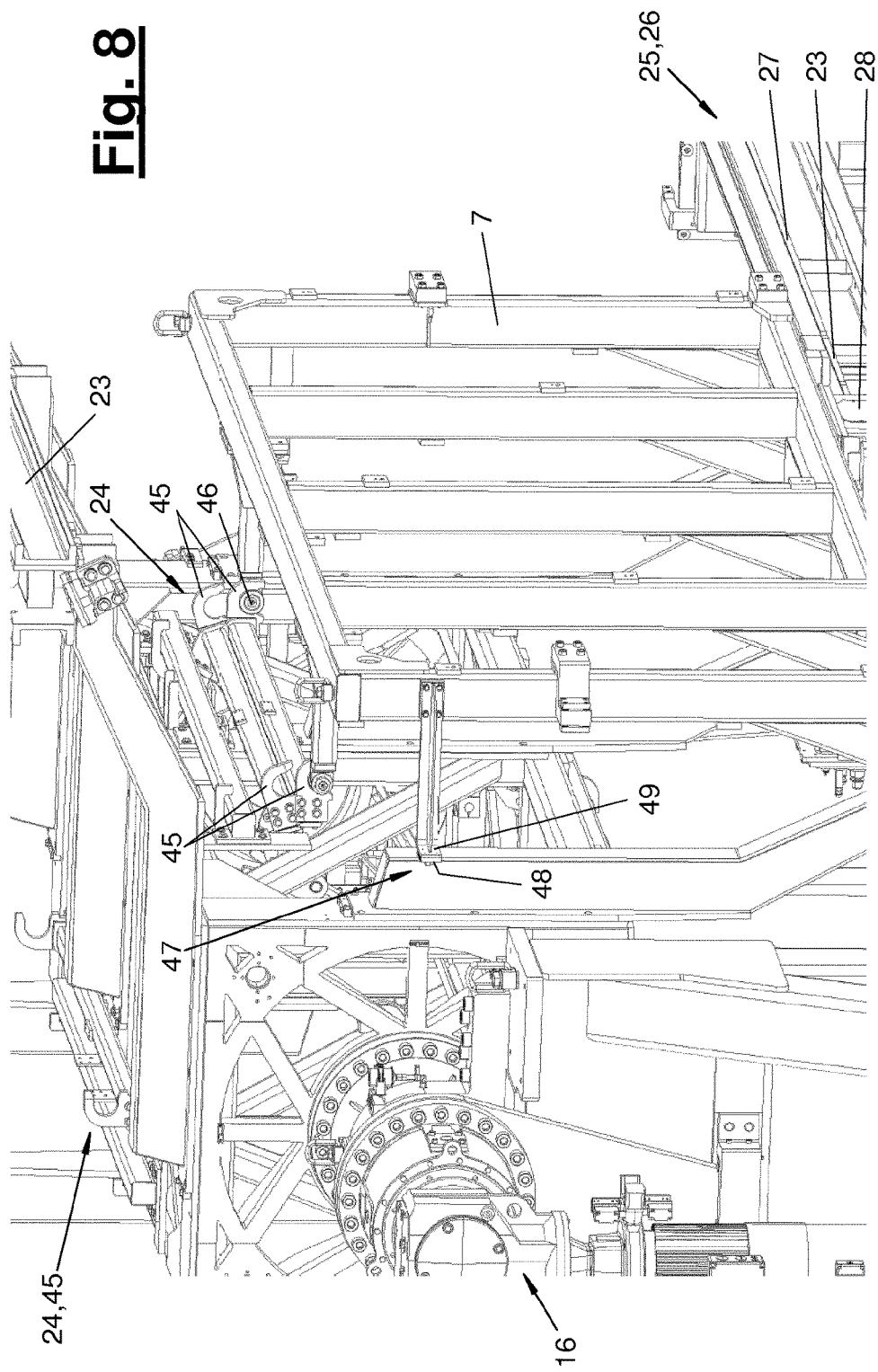
FIG. 8 is another enlarged detail view of FIG. 7.

The locking device (24) shown in FIGS. 4, 7 and 8 is formed by locking elements (45, 46) on the frame magazine (16-19) and on the clamping frame (6-9), which can mesh with one another in a positive-locking manner. The locking elements (45) on the frame magazine (16-19) are driven in a controllable manner. They can possibly move the clamping frame (6-9) somewhat during the locking. The locking elements (45) are configured, e.g., as pivotable grippers. These mesh with pin- or roller-like locking elements (46) on the clamping frame (6-9), which said locking elements are arranged there, e.g., on transversely projecting extension arms. The arrangement may also be reversed.

Further, media couplings (47) may be present at the magazine places between the frame magazines (16-19) and the received clamping frames (6-9). They comprise, e.g., each a coupling element (48) at the magazine place and a coupling element (49) at the clamping frame (6-9), which are present as a single element or as a plurality of elements and are arranged at the edge. The coupling elements (48, 49) may be used, in addition, as a mechanical peg for the clamping frames (6-9) at the magazine place.

The media couplings (47) may transmit operating materials, e.g., fluids, power and/or signal currents. As a result, movable clamping, positioning and support devices of the clamping frames (6-9) can be activated and locked in their desired positions and secured. This prevents uncontrolled spontaneous motions and risks of collision that result therefrom, especially in case of the horizontal position of the clamping frame at the frame magazine (16-19). Data can be exchanged via the signal currents or in another manner. This is advantageous for control and identification purposes. The control always knows where which clamping frame (6-9) is located.

The media couplings (47) can be automatically opened and closed in the receiving position at the magazine place by the locking device (24) during the locking motion of the latter. As an alternative, they may have an actuator of their own for controlled opening and closing.

The storage device (15) may have the above-mentioned one or more additional storage places (20) for one or more clamping frames (6-9). In the exemplary embodiments shown, the conveyor tracks (26, 32) extend beyond one or more associated frame magazines (16-19) at one end or at both ends. Such a storage place (20) each is formed at this projection of the track. One or more clamping frames (6-9) each can be parked here outside the frame magazines (16-19).

Such track projections and storage places (20) may be present at all guide paths (26, 32). If required by the space needed for the processing plant (1) and the adjacent station or for other reasons, the number and arrangement of the storage places (20) may be reduced. Only the conveyor tracks (32) of the frame transporters (31) are extended in the exemplary embodiments shown at both ends to form storage places (20).

One or more additional storage places (20) may also be formed at the conveyor track (32) of the frame transporter (31) in the free space between the respective frame magazines (16, 17, 18, 19) located at spaced locations along the transfer line (5).

The frame transporter (31) is used to change the frame between the connected frame magazines (16-19) and optionally the additional storage places (20). The frame transporter (31) is not preferably connected to the workplace (10).

Figure 13:
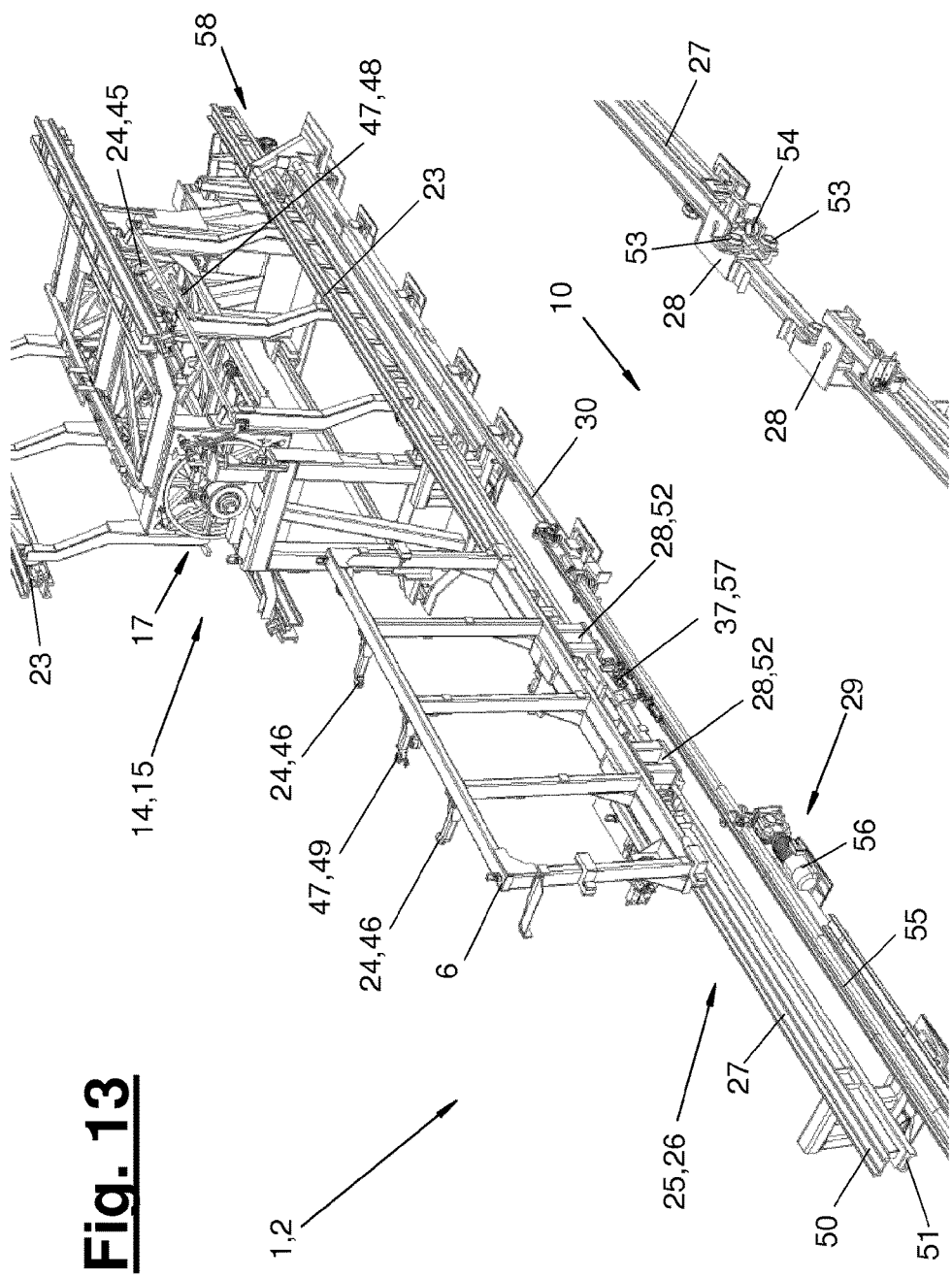
FIG. 13 is an enlarged perspective detail view for FIG. 12.

FIGS. 11 through 14 show a variant of the processing station (2), which has a discharge device (58) and which possibly makes do without external storage places (20). They show, in addition, another configuration and arrangement of the media coupling (47). The frame magazines (18, 19) on the right are not shown in FIG. 12 for the sake of greater clarity. The detail view in FIG. 13 is likewise one-sided and abstracted.

The variant may otherwise be consistent with the above-described exemplary embodiments according to FIGS. 1 through 10. This applies especially to the configuration of the frame conveyor (25) and frame transporter (31) as well as the positioning device (11) and the feeding device (13). FIGS. 11 through 14 show for this the details of the individual conveying devices (29) with the towing spar (55) with the drive (56) and guide path (30) as well as of the individual tow car (35) with the guide path (36). The guide paths (30, 36) are arranged each separately from the conveyor tracks (26, 32), which are, in turn, configured each as individual rails (27, 33) for the frame-side running gears (28) with fork arms (52) and support rollers (53, 54). The positioning device (11) is equipped with the above-described positioning elements (41-43) and fixing devices (44).

The discharge device (58) is used to insert and discharge clamping frames (6-9) and may be present as a single device or as a plurality of devices. It may adjoin one or both conveyor tracks (26) at one or both front ends. As an alternative or in addition, it may interact with the return conveyor track.

The discharge device (58) has a movable and preferably controllably driven discharge path (59), e.g., in the form of a rail section, which is aligned, on the one hand, with the conveyor track (26, 32) for transporting the clamping frame and can be moved, especially pivoted and, on the other hand, it can be moved, especially pivoted, into a changing position, which is, e.g., an oblique position, to a mobile discharge car (60). The discharge path (59) is arranged pivotably at the magazine frame (22) by means of a connecting rod mechanism and can be pivoted as a result between the positions shown in FIG. 11 in a space-saving manner.

The discharge car (60) can dock in an oblique pivoted position at the discharge path (59). It is preferably floor-mounted and vertically adjustable. It likewise has a path or rail section for receiving a clamping frame (6-9) or the running gear (28) thereof. It may be driven in a manually movable or controllable manner.

The width of the running gear is smaller than the width of the clamping frame. The rail sections of the discharge device (58) can therefore be configured as short and compact rail sections. This also applies to the above-described feeding device (13) and its path or rail section.

The media couplings (47) are configured and arranged differently in the variant. As is illustrated in FIGS. 13 and 14, the coupling elements (48, 49) are separated from the mechanical pegs and are arranged centrally at the clamping frames (6-9) and at the magazine places of the frame magazines (16-19). The coupling elements (48, 49) are located each on an extension arm of the clamping frame (6-9) and of the magazine places.

Various variants of the embodiments shown and described are possible. In particular, the features of the exemplary embodiments and of the variants mentioned may be combined with one another in any desired manner and optionally also be transposed.

The frame magazines (16-19) may have another configuration and arrangement.

They may be configured, e.g., as rotary tables with a plurality of magazine places and with an upright axis of rotation, e.g., corresponding to EP 1 858 750 B1. An even number of magazine places is recommended in case of such a magazine configuration as well.

Further, in a variant of the embodiments shown, frame magazines (16-19), frame conveyors (25) and frame transporters (31) as well as feeding and positioning devices (11, 13) may be arranged on only one side of the transfer line (5). In addition, it is possible to select another magazine arrangement instead of the shown arrangement in pairs of frame magazines (16-19) on both sides of the workplace (10) located between them. For example, only one frame magazine can be associated with a workplace (10) in this case. On the other hand, the number of the frame magazines associated with a workplace (10) may also be greater than two.

Design changes are also possible concerning the frame conveyor (25) and of the frame transporter (31). The clamping frames (6-9) may be held and supported on or at a conveying device (29, 35), in which case they are loaded and unloaded with, e.g., a suitable feeding device. The clamping frames (6-9) are not guided now independently any longer, so that the particular conveyor track (26, 32) is possibly reduced to the guide path (30, 36) of the frame conveyor (25) and/or frame transporter (31).

Depending on the configuration of the magazine, the frame conveyor (25) and the frame transporter (31) may be arranged at the same level relative to the particular connected frame magazine or frame magazines (16-19). This may happen, e.g., if the magazine is configured in the form of rotary tables or upright columns.

The locking device (24) and the media coupling (47) at the frame magazines (16-19) have an independent inventive significance each. They may optionally be used in a combination or as an alternative. Use is possible, furthermore, with all above-mentioned variants of frame magazines (16-19) with or without frame transporter (31).

Such variants may otherwise have the same or corresponding configuration as the exemplary embodiments shown.

While specific embodiments of the invention have been shown and described in detail to illustrate the application of the principles of the invention, it will be understood that the invention may be embodied otherwise without departing from such principles.

The invention claimed is:

1. A changing apparatus for clamping frames at a processing station for vehicle body parts, the changing apparatus comprising:
    a storage device for the clamping frames;
    a plurality of frame magazines movable in a controlled manner, the frame magazines having a controllable locking device and a media coupling for the clamping frames, the media coupling being automatically opened and closed via the controllable locking device, wherein the media coupling is configured to transmit operating materials and data between at least one of the plurality of frame magazines and at least one of the clamping frames;
    a frame conveyor configured for transporting the clamping frames between the frame magazines and a workplace of the processing station, wherein the clamping frames are securely accommodated at the frame magazines; and
    another frame transporter connected to the frame magazines serviced by the frame conveyor, the another frame transporter being configured to transport the clamping frames between the frame magazines.

2. A changing apparatus in accordance with claim 1, wherein: the frame conveyor and the associated frame transporter are arranged on different sides of the jointly serviced frame magazines and parallel to each other; and the frame conveyor and the associated frame transporter are arranged in parallel to one another.

3. A changing apparatus in accordance with claim 1, wherein the frame conveyor and the frame transporter each have a conveyor track with a guide for an independent supporting and guiding the clamping frame and a driven, controllable conveying device for the clamping frames.

4. A changing apparatus in accordance with claim 3, wherein the conveying device is configured as a controllable tow car or as a guided spar with a stationary controllable drive.

5. A changing apparatus in accordance with claim 1, wherein the frame conveyor and/or the frame transporter has a plurality of separate and independently movable as well as controllable conveying devices and the conveying device has a controllable coupling for coupling and uncoupling one or more clamping frames.

6. A changing apparatus in accordance with claim 1, wherein the conveyor tracks of the frame conveyor and of the associated frame transporter are connected at different levels to a frame magazine.

7. A changing apparatus in accordance with claim 1, wherein the conveyor has a conveyor track with a guiding device for the clamping frames and a guide path, which is preferably separated therefrom, for a conveying device.

8. A changing apparatus in accordance with claim 1, wherein the frame magazines are configured as drum magazines with a horizontal axis of rotation or as rotary tables with an upright axis of rotation.

9. A changing apparatus in accordance with claim 1, further comprising: a feeding device with an individual path or rail section for the transport of a clamping frame from the frame conveyor to the workplace; and a positioning device for a stationary positioning and supporting of a clamping frame at a workplace.

10. A changing apparatus in accordance with claim 1, wherein the clamping frames circulate between interlinked frame magazines and have different configurations and are adapted to different vehicle body types and to different vehicle body parts.

11. A changing apparatus in accordance with claim 1, wherein the operating materials comprise one or more fluids, the controllable locking device being configured to fix a respective clamping frame in a fixed position in one of the frame magazines and to release the respective clamping frame from the fixed position, the one of the frame magazines and the another one of the frame magazines defining at least a portion of a clamping frame movement path, wherein the clamping frames are movable along the clamping frame movement path via the another frame transporter.

12. A processing station for vehicle body parts, the processing station comprising:
    a changing apparatus for clamping frames, which has a storage device for the clamping frames with a plurality of movable frame magazines, each of the frame magazines having a controllable locking device and a media coupling for the clamping frames, the media coupling being automatically opened and closed via the controllable locking device, wherein operating materials and data are transmitted between one of the plurality of frame magazines and one of the clamping frames via the media coupling when the media coupling is opened via the controllable locking device;

a frame conveyor configured for the transport of the clamping frames between frame magazines and a workplace, wherein the changing apparatus further comprises:

another frame transporter connected to the frame magazines serviced by the frame conveyor, the another frame transporter being configured to transport the clamping frames between the frame magazines.

13. A processing station in accordance with claim 12, wherein the operating materials comprise one or more fluids, the controllable locking device being configured to fix a respective clamping frame in a fixed position in one of the frame magazines and to release the respective clamping frame from the fixed position, at least one of the frame magazines and at least another one of the frame magazines defining at least a portion of a clamping frame movement path, wherein the clamping frames are movable along the clamping frame movement path via the another frame transporter.

14. A method for changing clamping frames for vehicle body parts at a processing station, the method comprising the steps of:

storing the clamping frames stored in a storage device comprising a plurality of frame magazines movable in a controlled manner, each of the frame magazines having a controllable locking device and a media coupling for the clamping frames, the controllable locking device being configured to open and close the media coupling, wherein operating materials and data are transmitted between one of the plurality of frame magazines and one of the clamping frames via the media coupling when the media coupling is opened via the controllable locking device;

transporting and changing the clamping frames, with a frame conveyor, between the frame magazines and a workplace;

securely accommodating the clamping frames at the frame magazines; and transporting and changing the clamping frames with another frame transporter between the frame magazines serviced by the frame conveyor, wherein at least one of the clamping frames is moved from one of the frame magazines to another one of the frame magazines via the another frame transporter.

15. A method in accordance with claim 14, wherein the clamping frames are securely accommodated at the frame magazines with at least the controllable locking device or with the media coupling.

16. A method in accordance with claim 14, wherein the clamping frames are guided and independently supported in a stable manner during transportation at a guide path with an individual.

17. A method in accordance with claim 14, wherein two clamping frames are moved together by a separately guided tow spar that can be coupled and uncoupled during the transportation at a guide path.

18. A method in accordance with claim 14, wherein the clamping frames are fed at the workplace by a feeding device with an individual path or rail section.

19. A method in accordance with claim 14, wherein the clamping frames are positioned and supported stationarily in the three directions x, y and z in space at the workplace by means of a positioning device with a plurality of positioning elements, especially roller blocks and a strut.

20. A method in accordance with claim 14, wherein the controllable locking device is configured to fix a respective clamping frame in a fixed position in one of the frame magazines and to release the respective clamping frame from the fixed position, the operating materials comprising one or more fluids, wherein a clamping frame path is defined by at least one of the frame magazines and another one of the frame magazines, wherein the clamping frames are movable along the clamping frame path via the another frame transporter.

* * * * *